United States Patent
Keiner et al.

(10) Patent No.: US 9,492,054 B2
(45) Date of Patent: Nov. 15, 2016

(54) WASHING MACHINE DESCALER INTRODUCTION APPARATUS

(71) Applicants: Frederick Keiner, Ozark, MO (US); Patricia Keiner, Ozark, MO (US)

(72) Inventors: Frederick Keiner, Ozark, MO (US); Patricia Keiner, Ozark, MO (US)

( * ) Notice: Subject to any disclaimer, the term of this patent is extended or adjusted under 35 U.S.C. 154(b) by 68 days.

(21) Appl. No.: 14/504,608

(22) Filed: Oct. 2, 2014

(65) Prior Publication Data

US 2016/0097148 A1 Apr. 7, 2016

(51) Int. Cl.
| | | |
|---|---|---|
| *D06F 39/00* | (2006.01) | |
| *A47L 15/42* | (2006.01) | |
| *F16K 31/60* | (2006.01) | |
| *C02F 5/08* | (2006.01) | |
| *C02F 1/68* | (2006.01) | |

(52) U.S. Cl.
CPC .............. *A47L 15/4231* (2013.01); *C02F 5/08* (2013.01); *D06F 39/007* (2013.01); *C02F 1/686* (2013.01); *C02F 2303/22* (2013.01); *C02F 2307/12* (2013.01)

(58) Field of Classification Search
CPC ........ B08B 3/00; C02F 5/08; C02F 2303/22; C02F 1/686; C02F 2307/12; A47L 15/4231; D06F 39/007
See application file for complete search history.

(56) References Cited

U.S. PATENT DOCUMENTS

| | | | |
|---|---|---|---|
| 2,884,349 A | 4/1959 | Axelrad | |
| 3,385,735 A * | 5/1968 | Brabrand | B01D 37/00 134/21 |
| 3,443,992 A | 5/1969 | Schmidt et al. | |
| 4,434,629 A * | 3/1984 | Bianchi | D06F 35/004 134/100.1 |
| 4,913,823 A | 4/1990 | Lipinski et al. | |
| 5,021,096 A | 6/1991 | Abadi | |
| 5,176,297 A * | 1/1993 | Mooney | A47L 15/4445 222/325 |
| 5,494,527 A | 2/1996 | Ludwig et al. | |
| 6,295,411 B1 * | 9/2001 | Fastman | F24H 9/0042 122/4 A |
| 6,330,484 B1 * | 12/2001 | Qin | G05B 13/0275 700/30 |
| 2003/0213503 A1* | 11/2003 | Price | A47L 15/0015 134/18 |
| 2006/0185697 A1 | 8/2006 | Andriola et al. | |
| 2008/0308127 A1* | 12/2008 | Padtberg | A47L 15/0057 134/18 |
| 2012/0073519 A1* | 3/2012 | Deivasigamani | F24D 19/1051 122/14.3 |
| 2012/0121769 A1* | 5/2012 | Castellani | A47J 31/605 426/237 |
| 2012/0125861 A1* | 5/2012 | Thiers | C02F 5/02 210/718 |
| 2013/0048028 A1 | 2/2013 | Morin | |
| 2013/0174875 A1* | 7/2013 | Walker | B08B 9/027 134/22.11 |

\* cited by examiner

*Primary Examiner* — Michael Barr
*Assistant Examiner* — Benjamin L Osterhout
(74) *Attorney, Agent, or Firm* — The Keys Law Firm PLLC

(57) ABSTRACT

A washing machine descaler introduction apparatus for introducing a descaling agent to the water inlets of a conventional washer and dryer at a controlled rate comprises a dispensing bag with an attached dispensing valve assembly and an attachable diverter. In use, the dispensing bag, containing of a descaling agent, is hung from an elevated position above a convention washing machine with the water inlet conduits of the washing machine each connected to one of two outlet tubes of the diverter. Once a hole is opened for ventilation, the valve handle is moved from the closed position, partially or fully opening the valve assembly's outlet pipe, thereby enabling the descaling agent to exit the bag and be directed into the hot water inlet conduit and the cold water inlet conduit at a rate that is controlled by how unobstructed the outlet is with respect to the closing member.

16 Claims, 2 Drawing Sheets

WASHING MACHINE DESCALER INTRODUCTION APPARATUS

BACKGROUND OF THE INVENTION

Field of the Invention

This invention relates generally to deposit removal and, more particularly, to an apparatus for introduction a descaling agent to remove mineral deposits, such as calcium carbonate (or "limescale"), from water pipes and valves in a washing machine.

Description of the Prior Art

The use of conventional, modern washing machines (or "laundry machines") to wash clothes using water and detergent (and sometimes bleach) and then extract much of the water therefrom is well known. Through ordinary use of conventional washing machines, however, mineral deposits often build up in its conduits, such as pipes and valves, generally resulting in a decrease of efficiency and efficacy of the washing machine. As mineral deposits typically cannot be removed by merely flushing the conduits with water, common methods of eliminating the problem in washing machines often include removing or replacing pipes. While the general use of descaling agents is known, it is often difficult to properly introduce them to the pipes and valves used by a washing machine to enable optimal efficacy.

As a result, a problem which still exists is that simply pouring a descaling agent, such as the CLR® Calcium, Lime & Rust Remover, into a washing machine fails to optimize descaling efficacy. Thus, there remains a need for an apparatus for introducing a descaling agent to the water input conduits and facilitating the removal of mineral deposits therefrom. It would be helpful if such a washing machine descaler introduction apparatus enabled a descaling agent to simultaneously be introduced to both the hot and cold water inputs of the washing machine. It would be additionally desirable for such a washing machine descaler introduction apparatus to allow an descaler to be automatically introduced to the washing machine at a controlled pace to maximize the descaling agents' efficacy.

The Applicant's invention described herein provides for an apparatus adapted to allow a user to deliberately introduce a quantity of a descaling agent to the pipes and valves in a washing machine through both water inputs. The primary components in Applicant's washing machine descaler introduction apparatus are a dispensing receptacle, a dispensing valve member, and a diverter. When in operation, the washing machine descaler introduction apparatus enables more effective and efficient cleaning of the conduits of a washing machine. As a result, many of the limitations imposed by prior art structures are removed.

SUMMARY OF THE INVENTION

A washing machine descaler introduction apparatus for introducing a descaling agent to the water inlets of a conventional washer and dryer at a controlled rate. The washing machine descaler introduction apparatus comprises a dispensing receptacle, defined in the preferred embodiment as a dispensing bag, with an attached dispensing valve assembly and an attachable diverter. In use, the dispensing bag, full of a descaling agent, is hung from an elevated position above a convention washing machine with the valve handle of the dispensing valve assembly in the closed position, fully covering the outlet pipe of the dispensing valve assembly with a the closing member. The hot water inlet conduit and the cold water inlet conduit of the washing machine are then each connected to one of the outlet tubes of the diverter. Once a hole is opened for ventilation, the valve handle is moved out of the closed position, moving the closing member partially or fully off of the outlet pipe, thereby enabling the descaling agent to exit the bag and be directed into the hot water inlet conduit and the cold water inlet conduit at a rate that is controlled by how unobstructed the outlet is with respect to the closing member. The descaling agent can then work its way through the washing machine, which is typically run during this process, at a controlled pace to optimize its descaling activity.

It is an object of this invention to provide an apparatus for introducing a descaling agent to the water input conduits and facilitating the removal of mineral deposits therefrom.

It is another object of this invention to provide a washing machine descaler introduction apparatus that enables a descaling agent to simultaneously be introduced to both the hot and cold water inputs of the washing machine.

It is yet another object of this invention to provide a washing machine descaler introduction apparatus that allows an descaler to be automatically introduced to the washing machine at a controlled pace to maximize the descaling agents' efficacy.

These and other objects will be apparent to one of skill in the art.

DETAILED DESCRIPTION OF THE INVENTION

Figure 1:
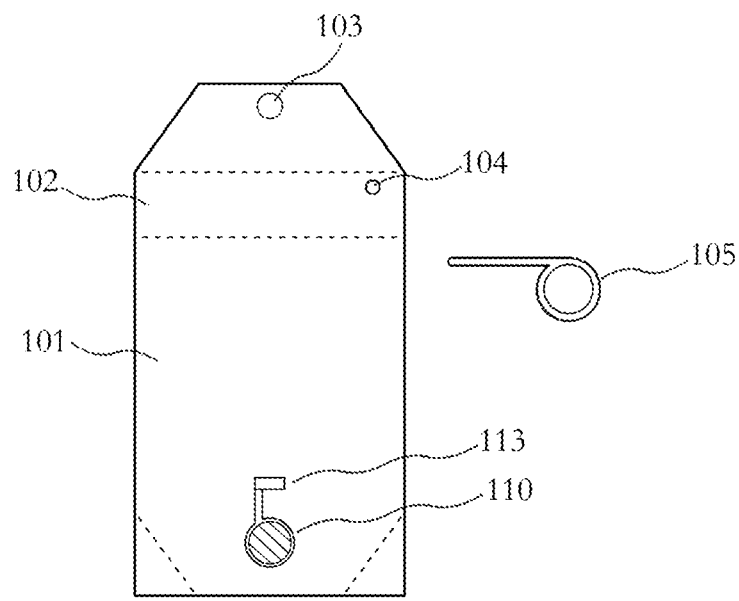
FIG. 1 is a front elevational view of a washing machine descaler introduction apparatus built in accordance with the present invention having its dispensing valve closed.
Figure 2A:
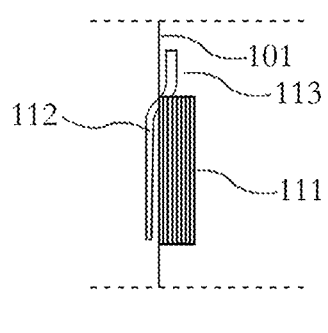
FIG. 2A is a side cross-sectional view of the dispensing valve member of a washing machine descaler introduction apparatus built in accordance with the present invention.
Figure 2B:
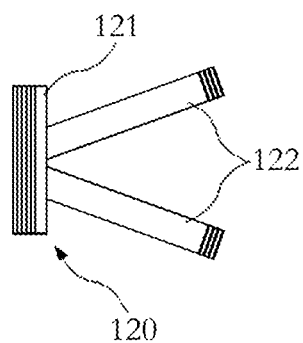
FIG. 2B is a side elevational view of the diverter of a washing machine descaler introduction apparatus built in accordance with the present invention.
Figure 3:
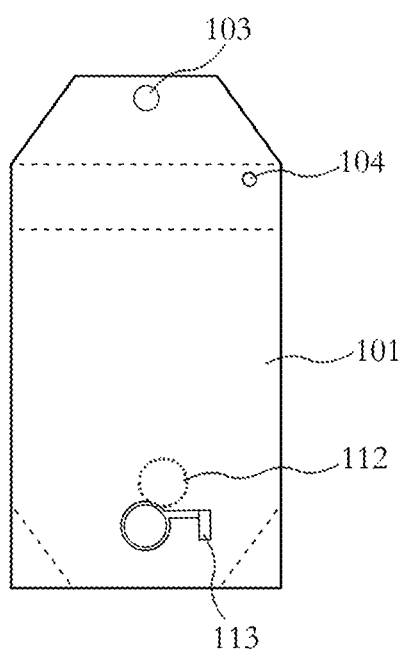
FIG. 3 is a front elevational view of a washing machine descaler introduction apparatus built in accordance with the present invention having its dispensing valve open.
Figure 4:
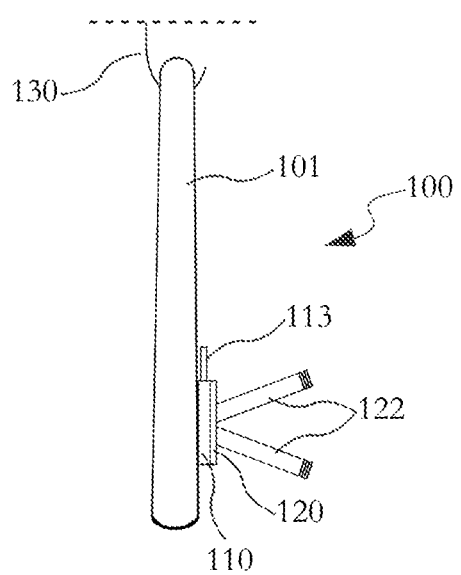
FIG. 4 is a side elevational view of a washing machine descaler introduction apparatus built in accordance with the present invention.

Referring now to the drawings and in particular FIGS. 1, 2A and 2B, a washing machine descaler introduction apparatus is shown as a dispensing receptacle and having an attached dispensing valve assembly 110 and an attachable diverter 120. In the preferred embodiment, the dispensing receptacle is defined as a reinforced dispensing bag 101 having a reinforced upper section 102 and a tapered bottom section. It is contemplated that the lower area in the dispensing bag 101, below the reinforced area, is filled with a conventional descaling agent, such as the CLR® Calcium, Lime & Rust Remover, which is to be dispensed from the bag 101, through the valve assembly 110 and the diverter 120, into the pipes of a washing machine (not shown). In addition, said lower area is detachable and disposable from the reinforced section 102.

The dispensing bag 101 includes a mounting aperture 103 that allows the dispensing bag to be hung from a hook or other structure and a reinforced air outlet 104 for being punctured and providing through the puncture an air hole that ventilates the bag 101 when fluid is exiting. It is contemplated that an air hole can be punctured in the air outlet 104 by a puncture tool 105 having an elongated edge.

The dispensing valve assembly 110 is defined by a closeable outlet pipe having a threaded interior surface 111 extending from the front of the dispensing bag 101 and a sliding closing member 112 on the interior of the bag 101 connected to a valve handle 113 that extends outside the bag 101 for selectively opening and closing the outlet pipe of the dispensing valve assembly 110.

The diverter 120 is defined by a splitting connecting member having a threaded outer base surface 121 and two threaded outlet tubes 122. The diverter 120 is constructed to engage the threaded interior surface 111 of the dispensing valve assembly 110, forming a fluid tight attachment, and split fluid exiting the dispensing valve assembly 110, dispensing it from both of the outlet tubes 122.

Referring now to FIGS. 1, 2A, 2B, 3, and 4, when the washing machine descaler introduction apparatus 100 is in use, the dispensing bag 101, full of a descaling agent, is hung from an elevated position above a convention washing machine, typically from a hook 130 through the mounting aperture 103. Prior to use, it is contemplated that the valve handle 113 will remain in a closed position, as shown in FIG. 1, with the closing member 112 fully covering the outlet pipe of the dispensing valve assembly 110. The hot water inlet conduit and the cold water inlet conduit of the washing machine are then each connected to one of the outlet tubes 122. The puncture tool 105 is then used to open a hole in the air outlet 104 and then the valve handle 113 is moved out of the closed position, moving the closing member 112 partially or fully off of the outlet pipe of the dispensing valve assembly 110, thereby enabling the descaling agent to exit the bag 101 and be directed into the hot water inlet conduit and the cold water inlet conduit at a rate that is controlled by how unobstructed the outlet pipe of the dispensing valve assembly 110 is with respect to the closing member 112.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A washing machine descaler introduction apparatus for connection to the water inlet conduits of a washing machine, comprising:
    a dispensing receptacle adapted to be filled with a descaling agent and having a selectively openable air outlet therein;
    a dispensing valve assembly integrated into said dispensing receptacle, wherein said dispensing valve assembly is defined by a selectively closeable outlet pipe having a threaded interior surface; and
    a diverter removably attached to said dispensing valve assembly and having a plurality of outlet tubes for connecting to the water inlet conduits of a washing machine, wherein when the air outlet is open and the outlet pipe is not closed, descaling agent in the dispensing receptacle flows through the plurality of outlet tubes for entry into the water inlet conduits.

2. The washing machine descaler introduction apparatus of claim 1, wherein the dispensing receptacle additionally includes a mounting aperture for allowing it to be hung in an elevated position.

3. The washing machine descaler introduction apparatus of claim 1, wherein the dispensing valve assembly includes a closing member which can be placed over the outlet pipe or moved partially or fully off the outlet pipe.

4. The washing machine descaler introduction apparatus of claim 3, wherein the closing member is connected to a valve handle that enables it to be moved through the application of manual pressure.

5. The washing machine descaler introduction apparatus of claim 1, wherein the diverter includes a threaded outer base surface and removably attaches to the dispensing valve assembly through the engagement of the outer base surface threads and the interior surface threads.

6. The washing machine descaler introduction apparatus of claim 1, wherein the diverter includes a threaded outer base surface.

7. The washing machine descaler introduction apparatus of claim 1, wherein the diverter includes two outlet tubes.

8. The washing machine descaler introduction apparatus of claim 7, wherein each of the outlet tubes include a threaded exterior surface thereon.

9. The washing machine descaler introduction apparatus of claim 1, wherein each of the outlet tubes include a threaded exterior surface thereon.

10. A washing machine descaler introduction apparatus for connection to the water inlet conduits of a washing machine, comprising:
    a dispensing receptacle adapted to be filled with a descaling agent and having a selectively openable air outlet therein;
    a dispensing valve assembly integrated into said dispensing receptacle, wherein said dispensing valve assembly is defined by a selectively closeable outlet pipe;
    a diverter removably attached to said dispensing valve assembly and having a plurality of outlet tubes for connecting to the water inlet conduits of a washing machine, wherein when the air outlet is open and the outlet pipe is not closed, descaling agent in the dispensing receptacle flows through the plurality of outlet tubes for entry into the water inlet conduits; and
    wherein each of the outlet tubes include a threaded exterior surface thereon.

11. The washing machine descaler introduction apparatus of claim 10, wherein the diverter includes two outlet tubes.

12. The washing machine descaler introduction apparatus of claim 10, wherein the dispensing valve assembly is defined by a closeable outlet pipe having a threaded interior surface.

13. The washing machine descaler introduction apparatus of claim 10, wherein the diverter includes a threaded outer base surface.

14. A washing machine descaler introduction apparatus for connection to the water inlet conduits of a washing machine, comprising:
    a dispensing receptacle adapted to be filled with a descaling agent and having a selectively openable air outlet therein;
    a dispensing valve assembly integrated into said dispensing receptacle, wherein said dispensing valve assembly is defined by a selectively closeable outlet pipe;
    a diverter removably attached to said dispensing valve assembly and having a plurality of outlet tubes for connecting to the water inlet conduits of a washing machine, wherein when the air outlet is open and the outlet pipe is not closed, descaling agent in the dispensing receptacle flows through the plurality of outlet tubes for entry into the water inlet conduits; and
    wherein the diverter includes a threaded outer base surface.

15. The washing machine descaler introduction apparatus of claim 14, wherein the dispensing valve assembly is defined by a closeable outlet pipe having a threaded interior surface.

16. The washing machine descaler introduction apparatus of claim 14, wherein each of the outlet tubes include a threaded exterior surface thereon.

\* \* \* \* \*